United States Patent Office

3,149,180
Patented Sept. 15, 1964

3,149,180
HYDROISOMERIZATION OF OLEFIN
HYDROCARBONS
Joost C. Platteeuw and Johannes H. Choufoer, Amsterdam, Netherlands, assignors to Shell Oil Company, New York, N.Y., a corporation of Delaware
No Drawing. Filed June 30, 1960, Ser. No. 39,818
Claims priority, application Netherlands July 13, 1959
15 Claims. (Cl. 260—683.65)

This invention relates to a process for the catalytic conversion of unbranched or lightly branched hydrocarbons into branched or more highly branched hydocarbons having the same number of carbon atoms. More particularly, the process relates to the isomerization of normal olefins to isoparaffins having the same number of carbon atoms. The invention more particularly relates to the application of special catalyst and special reaction conditions for an improved method of carrying out the isomerization.

Normal olefins in the gasoline boiling range have a high octane rating, particularly blending octane rating. However, their presence in motor gasoline in recent years has been increasingly undesirable because of their high sensitivity and because of their effect on air pollution. By sensitivity it is meant the difference in octane rating determined by the research method (F-1) and the octane rating determined according to the motor method (F-2). It is known that these olefins can be converted to the corresponding saturated hydrocarbon by hydrogenation, usually by a catalytic process employing such catalysts as tungsten, molybdenum, manganese, iron, nickel, cobalt, etc., their sulfides and oxides and combinations thereof. However, while the octane rating of the normal olefin is relatively high, the octance rating of the saturated product prepared by the simple hydrogenation processes is often very much lower and therefore hydrogenation processes have not been looked upon with favor.

It is also well known to convert normal paraffins to isoparaffins by catalytic isomerization processes. Commonly known isomerization catalysts are the aluminum halides, such as aluminum chloride, platinum on alumina, and nickel on silica-alumina. The octane number of the isoparaffin is higher than the corresponding normal paraffin. Moreover, the isoparaffins, like the normal paraffins, have a low sensitivity.

It has been proposed to convert high sensitivity normal olefins into low sensitivity isoparaffins by first hydrogenating the olefin and then isomerizing the resulting normal paraffin to the isoparaffin. Another method has been described by Howes et al. U.S. 2,357,741, September 5, 1944, wherein conversion is carried out in two stages with an isomerization catalyst used in the first stage and a hydrogenation catalyst in the second stage. The disadvantages of using two stages with two separate catalysts are obvious.

It has now been found that when unbranched or lightly branched olefins are contacted with a special catalyst which has both isomerization and hydrogenation activity, a high yield of branched or more highly branched hydrocarbons is obtained. The conversion is carried out at an elevated temperature and pressure in the presence of hydrogen or a hydrogen-containing gas.

The catalyst used in the process of the invention comprises a solid acid isomerization catalyst containing a sulfide of one or more of the metals of the left hand column of Group VI (chromium, molybdenum, tungsten) and/or a sulfide of one or more of the metals of Group VIII (iron, cobalt, nickel) of the Periodic table. By solid acid isomerization catalyst it is meant those which, when absorbing butter yellow and still other weaker basic indicators, show a color change of these indicators, indicating the transition to the acid form. Suitable acid isomerization catalysts for the dual function catalyst of the invention are compounds of silica and alumina, such as silica-alumina cracking catalyst, compounds of silica and zirconium dioxide, compounds of boron trioxide and alumina, compounds of boron trioxide and silica, compounds of alumina and halogen such as alumina and fluorine, and the like. The catalysts consisting of silica-alumina compounds, in particular those having a silica content of at least 60% by weight and an alumina content of about 1 to 40% by weight are preferred.

A component having hydrogenation activity is deposited or distended on the solid acid isomerization component. Suitable components showing hydrogenation activity are sulfides of the metals on the left-hand column of Group VI and/or the metals of Group VIII of the periodic table. Nickel sulfide and/or cobalt sulfide are particularly preferred.

The benefit obtained from using sulfides of nickel, cobalt and molybdenum is quite surprising since those compounds are known to have weak hydrogenative activity and generally must be mixed with other compounds or used at extreme reaction conditions to hydrogenate monoolefins effectively. In fact, the weak hydrogenative activity of nickel sulfide and molybdenum sulfide has led to their use in the selective hydrogenation of polyolefinic compounds to monoolefinic compounds without substantial formation of the saturated compound, e.g. Greensfelder et al. U.S. 2,674,634, April 6, 1954 and Greensfelder et al. U.S. 2,402,493, June 18, 1946.

The amount of metal sulfide applied to the acid isomerization catalyst can vary within wide limits and is generally in the range of from about 0.5 to about 15% by weight based on the total catalyst. Thus, for example, a catalyst containing silica and alumina and having a silica content of at least 60% by weight (based on the total catalyst) and to which is applied 1 to 10% by weight of nickel sulfide (based on the total catalyst) is an excellent catalyst for use in the process of the invention. The metal sulfide can be applied to the acid isomerization catalyst, for instance silica-alumina cracking catalyst, by any suitable method known per se. For example, the metal sulfide can be appiled by impregnating the acid catalyst with a solution of a salt of the corresponding metal, for instance nickel nitrate, followed by drying, calcining and finally sulfiding with hydrogen sulfide or a gas containing hydrogen sulfide.

The silica-alumina support preferably is calcined at an elevated temperature prior to impregnation with the metal sulfide. This calcination can be carried out at temperatures up to about 600° C. Higher calcination temperatures generally are undesirable since they lead to increased disproportionation reactions in the isomerization process.

The process of the invention is particularly suitable for the isomerization of the carbon skeleton of olefins having from 4 to 8 carbon atoms per molecule and especially the normal olefins having from 4 to 8 carbon atoms per molecule. The olefinic starting material can consist of one or more olefins or mixtures of one or more olefins and other hydrocarbons. The olefinic starting material to be converted is generally passed over the dual function catalyst at a liquid hourly space velocity of from about 0.5 to about 20 liters of liquid hydrocarbons per hour per liter of catalyst (l./h.l.), although lower or higher space velocities may also be used. A lower liquid hourly space velocity results in a more drastic hydrogenation of the unconverted olefin and of the branched olefins formed.

The process of the invention can also be used with particular advantage when the olefinic starting material also contains diolefins, such as, for example, gasoline from thermal or catalytic cracking processes. The active life of solid acidic isomerization catalysts used alone heretofore was found to be very short, particularly in the isomerization of such feed stocks containing diolefins, and this is presumably due to the formation of diene polymers and the like which deposit on the catalyst and rapidly reduce its activity. In the present process, however, the dienes are selectively hydrogenated to the monoolefin which again participate in the isomerization reaction (or any subsequent hydrogenation reaction). This not only extends the life of the catalyst, but leads to a higher yield of branched hydrocarbons. Similarly, when olefinic starting materials are employed which do not contain diolefins the life of the present catalyst is more favorable than the life of the catalyst used heretofore.

The conversion of olefins in the present process is carried out in the presence of hydrogen and at elevated pressures, preferably at a total pressure not exceeding 100 atmospheres, and in particular a total pressure varying from about 10 to about 100 atmospheres. Total pressures lower than 10 atmospheres preferably are not used since at low pressures isomerization activity of the catalyst has a shorter life. Total pressures exceeeding 100 atmospheres are preferably not used since the higher the pressure the lower the yield of branched compounds. The hydrogen partial pressure may vary within wide limits and is preferably from about 50% to 95% of the total pressure. Pure hydrogen is not necessarily used, as hydrogen-containing gases, such as the hydrogen-rich gases from a reforming process, are also suitable.

Conversion of the olefins is carried out at an elevated temperature generally in the range of from 100° C. to 500° C. and preferably at about 200° C. to 400° C. The catalysts used in the present process have excellent activity even at the preferred low temperatures.

The olefins which occur in the starting materials used in the present process are mainly converted into branched or more highly branched olefins and/or paraffins, the degree of saturation of the final product being dependent on the composition of the catalyst and the particular reaction conditions to be used. If the reaction conditions are such that there is little or no hydrogenation of the reaction product, the product may, if desired, be separately catalytically hydrogenated in the usual manner known per se, for instance by means of a catalyst containing nickel, platinum, or cobalt sulfide, molybdenum sulfide.

The following examples further illustrate the principles of the invention and show in more detail one method of carrying it out. They also indicate the advantages, particularly with respect to conversion of normal olefins to the corresponding isoparaffins.

EXAMPLE I

A mixture of hexene-1 and hydrogen in a hydrogen to hydrocarbon mole ratio of 4 to 1 was passed over an acid isomeration catalyst comprising 88% by weight of silica, and 12% by weight of alumina at a total pressure of 20 kilograms per square cm., a temperature of 320° C., and a liquid hourly space velocity of 2 l./h.l.

In a second test the same mixture was passed at the same conditions over a catalyst comprising 83.8% by weight of silica, 11.4% by weight of alumina, and 4.8% by weight of nickel sulfide.

In a third test normal hexane was passed over the latter catalyst under the same conditions.

Product compositions for each test period are shown in the following Table I.

The $C_5+$ fraction was completely hydrogenated and the F–1–0 octane number of the resultant product was determined. These octane numbers are also given in Table I.

Table I

| Feed | Hexene-1 | | | Hexene-1 | | | | N-hexane |
|---|---|---|---|---|---|---|---|---|
| Catalyst | Silica-alumina | | | Silica-alumina-nickel sulfide | | | | Silica-alumina-nickel sulfide |
| Test period in hours | 1.5 | 3.7 | 6.4 | 1.6 | 2.7 | 4.1 | 6.3 | 6. |
| Composition of final product, percent w: | | | | | | | | |
| Methane | 0.2 | 0.3 | 0.2 | 0.2 | 0.3 | 0.2 | 0.2 | |
| Ethene and ethane | 0.1 | 0.2 | 0.2 | 0.3 | 0.4 | 0.2 | 0.2 | |
| Propene and propane | 0.8 | 0.8 | 0.6 | 2.3 | 2.5 | 2.0 | 1.8 | |
| i-Butene and -butane | 1.3 | 0.8 | 0.6 | 13.3 | 13.4 | 12.0 | 10.9 | |
| n-Butenes and -butane | 0.7 | 0.6 | 0.6 | 2.0 | 2.0 | 1.6 | 1.6 | |
| i-Pentenes and -pentane | 1.5 | 0.8 | 0.8 | 12.8 | 13.0 | 12.0 | 11.5 | |
| n-Pentenes and -pentane | 0.4 | 0.4 | 0.6 | 0.3 | 0.4 | 0.3 | 0.2 | |
| 2,2-dimethyl-butenes and -butane | 0.2 | 0.2 | 0.2 | 0.1 | 0.2 | | | |
| 2,3-dimethyl-butenes and -butane | 3.9 | 1.9 | 1.6 | 9.1 | 9.4 | 9.9 | 10.3 | |
| 2-methyl-pentenes and -pentane | 23.2 | 17.9 | 14.0 | 32.0 | 32.2 | 33.4 | 34.8 | methyl pentanes 0.1. |
| 3-methyl-pentenes and -pentane | 15.5 | 11.3 | 9.3 | 19.7 | 19.6 | 21.0 | 21.4 | |
| n-Hexenes and n-hexane | 49.4 | 63.3 | 70.1 | 2.5 | 2.3 | 3.1 | 2.9 | n-hexane 99.9 |
| Higher hydrocarbons | 2.8 | 1.5 | 1.2 | 5.4 | 4.3 | 4.3 | 4.2 | |
| Yield $C_5+$ fraction, percent by weight | 97 | 97 | 98 | 82 | 81 | 84 | 85 | |
| F–1–0 octane number of the saturated $C_5+$ fraction. | 50 | 42 | 39 | 79 | 79 | 78 | 79 | |

The preceding table shows that in the conversion of hexene-1 by means of a silica-alumina nickel sulfide catalyst a substantially higher yield of branched hydrocarbons was obtained than was obtained in the conversion of the same feed by means of a silica-alumina catalyst containing no nickel sulfide. No aromatics were formed. Also when normal hexane was used, only a very slight conversion into the branched saturated hydrocarbons was obtained. Moreover, activity of the present dual function catalyst used in the process of the invention remained practically constant and did not decline like the catalyst used heretofore without nickel sulfide.

EXAMPLE II

Two tests were carried out to study the activity of other catalysts. In one test nickel oxide was distended on a silica-alumina cracking catalyst carrier, and in the other test platinum was distended on a silica-alumina carrier.

A mixture of hexene-1 and hydrogen in a hydrogen to hydrocarbon molar ratio of 4 to 1 was passed over each of these catalysts at a temperature of 320° C., a pressure of 20 atmospheres, and a liquid hourly space velocity of 2 l./h.l.

In addition, another test was carried out in which a mixture of hexene-1 and hydrogen was passed over a catalyst comprising a non-acid carrier, viz. alumina on which cobalt sulfide-molybdenum sulfide was distended. The reaction conditions used in this were: temperature, 380° C.; pressure, 36 atmospheres; liquid hourly space velocity, 2 l./h.l.; hydrogen to hydrocarbon molar ratio, 8 to 1.

The results of these tests are summarized in the following Table II. The duration of each test was one hour and the final products were all saturated. The catalyst composition is given in percent by weight.

The F-1-0 octane number of the $C_5+$ fraction obtained in the first test (with cracking catalyst plus nickel oxide) was also determined and is given in the table.

*Table II*

| Feed | Hexene—1 | Hexene—1 | Hexene—1 |
|---|---|---|---|
| Catalyst | Silica—82.7; alumina—11.9; nickel oxide—6.0 | Silica—87.1; alumina—11.9; platinum—1.0 | Alumina—84; cobalt sulfide—5; molybdenum sulfide—11 |
| Composition of the final product, percent w: | | | |
| Methane | 0.7 | | |
| Ethane | 0.7 | | |
| Propane | 4.3 | | |
| i-Butane | 11.1 | | |
| n-Butane | 4.1 | | |
| 2-methyl butane | 8.8 | | |
| n-Pentane | 2.6 | | |
| 2,2-dimethyl butane | 1.2 | | |
| 2,3-dimethyl butane | 3.9 | | |
| 2-methyl pentane | 21.0 | | 5.1 |
| 3-methyl pentane | 12.2 | 0.5 | 4.3 |
| n-Hexane | 25.2 | 99.5 | 90.6 |
| Higher hydrocarbons | 4.2 | | |
| Yield of $C_5+$ fraction, percent w | 79 | | |
| F-1-0 octane number of the $C_5+$ fraction | 61 | | |

Thus, it can be seen that the platinum catalyst and Co/Mo sulfide catalyst are entirely unsuitable for isomerization of hexene-1. Isomerization of hexene-1 was obtained with the nickel oxide catalyst, although to a lesser extent than with the special catalyst of the invention.

EXAMPLE III

The starting material in this experiment was a 41–180° C. boiling range (ASTM) gasoline obtained as a by-product in the preparation of ethene and propene by thermally cracking in the presence of steam a straight-run hydrocarbon oil having a final boiling point of 230° C. This gasoline, which was highly unsaturated and contained about 10% diolefins in addition to monoolefins, was subjected hydroisomerization in the vapor phase with sulfided nickel (5% w.) on silica-alumina cracking catalyst as the isomerization catalyst. The isomerization was carried out at a pressure of 20 kg./cm.², temperature of 300° C., LHSV of 1.0 l./h.l., and hydrogen to hydrocarbon molar ratio of 4 to 1. In addition, the gasoline was subjected to simple hydrogenation over sulfided cobalt-molybdenum on alumina. The results tabulated below show that while the sensitivity was lowered appreciably in each case, the Research Method octane rating (F-1-1.5) obtained with the special nickel sulfide on silica-alumina catalyst was considerably higher than for the simple hydrogenation catalyst. Saturation was substantially complete in both experiments. In addition, hydrotreating the steam-cracked gasoline over a selective hydrogenation catalyst to a Bromine number of 43 and MAV number of 5 reduced sensitivity to only 12.9.

*Table III*

HYDROTREATING STEAM-CRACKED GASOLINE

| | Feed | Product | |
|---|---|---|---|
| | | Nickel sulfide on silica-alumina | Sulfided Co/Mo on alumina |
| Bromine No | Ca 50 | 2 | 0 |
| MAV | Ca 110 | 0 | 0 |
| F-1-1.5 | 99.5 | 97.0 | 94.3 |
| F-2-1.5 | 84.4 | 89.8 | 88.3 |
| Sensitivity | 15.1 | 7.2 | 6.0 |

EXAMPLE IV

A light catalytically cracked gasoline boiling below 100° C. and derived from a Kuwait crude was subjected to hydrotreating over nickel sulfide deposited on calcined silica-alumina. The silica-alumina support was calcined at 500° C. for catalyst A and at 600° C. for catalyst B. Conditions and results are shown below.

*Table IV*

HYDROTREATING LIGHT CATALYTICALLY CRACKED GASOLINE OVER SULFIDED NICKEL (5% w.) ON SILICA-ALUMINA

| | A | B |
|---|---|---|
| Conditions: | | |
| Temperature, ° C | 310 | 310 |
| Pressure, kg./cm.² | 20 | 20 |
| Molar ratio, $H_2$/oil | 4/1 | 4/1 |
| LHSV, l./h.l. | 1.0 | 1.0 |
| Products: | | |
| Yield, $C_5+$, percent w | 87 | 87 |
| F-1-1.5 | 91.5 | 89.6 |

In each experiment the octane rating was higher than an F-1-1.5 of 87.2 obtained by simple hydrogenation of the light catalytically cracked gasoline. Moreover, the octane rating can be improved by removing any heavy material formed by disproportionation reactions. For example, when the gasoline obtained in run A was "bottomed" to remove material boiling above 100° C., the resulting tops had an F-1-1.5 octane rating of 93.5 with a yield of 80% w. based on the reactor intake. An octane as high as 96.0 (F-1-1.5) at a tops yield of 70% w., based on reactor intake, was obtained when the gasoline product was bottomed at 85° C.

EXAMPLE V

Experiments were conducted on the hydroisomerization of pentene-1 in the presence of nickel sulfide on silica-alumina cracking catalyst. Conditions and results are given in Table V. The octane rating of the product is considerably improved when compared to an F–1–0 of 62 for normal pentane which would be obtained by saturation of the pentene-1.

Table V
HYDROTREATING PENTENE-1 OVER SULFIDED NICKEL (5%w.) ON SILICA-ALUMINA

| Conditions: | | |
|---|---|---|
| Temperature, °C | 300 | 300 |
| Pressure, kg./cm.² | 20 | 20 |
| Molar ratio, H₂/oil | 4/1 | 4/1 |
| LHSV/l./h.l | 2.0 | 2.0 |
| Calcination temp. of carrier, °C | 500 | 600 |
| Composition of Product, percent w.: | | |
| $C_1$–$C_3$ | 2 | 2 |
| i-$C_4$ | 13 | 12 |
| n-$C_4$ | 2 | 2 |
| i-$C_5$ | 61 | 48 |
| n-$C_5$ | 6 | 4 |
| Total $C_6$ | 16 | 17 |
| Total $C_7$ | | 15 |
| | 100.0 | 100.0 |
| F–1–0 of $C_5$+ | 87.4 | 82.2 |

EXAMPLE VI

This example illustrates the isomerization of normal butene. Experiments were carried out by passing butene-1 over sulfided nickel (5% w.) on silica-alumina cracking catalyst. Reaction conditions and reaction product composition are shown in the following table.

Table VI
HYDROTREATING BUTENE-1 OVER NICKEL SULFIDE ON SILICA-ALUMINA CATALYST

| Conditions: | | |
|---|---|---|
| Temperature, °C | 320 | 320 |
| Pressure, kg./cm.² | 20 | 30 |
| LHSV, l./h.l | 2.0 | 2.0 |
| Molar ratio, H₂/oil | 4/1 | 4/1 |

| Composition of Reaction Products, percent w. | Initial | After 4 hrs. | Initial | After 4 hrs. |
|---|---|---|---|---|
| $C_1$–$C_3$ | 5 | 3 | 6 | 6 |
| i-$C_4$ | 42 | 21 | 47 | 47 |
| n-$C_4$ | 17 | 57 | 25 | 24 |
| i-$C_5$ | 22 | 10 | 19 | 19 |
| n-$C_5$ | 1 | 1 | | |
| i-$C_6$ | 8 | 4 | 3 | 4 |
| n-$C_6$ | | | | |
| Total $C_4$ | 5 | 4 | | |
| | 100 | 100 | 100 | 100 |

EXAMPLE VII

A solution of 966 g. of AlCl₃.6 aq in 10 liters of water was mixed intensively with 10 liters of ammonia solution of 2.7% concentration. Mixing took place by tangentially introducing each solution at a rate of 20 liters per hour into a mixing chamber, in such a way that after mixing the pH was between 8 and 8.5. Precipitation of the aluminum hydroxide gel was carried out without heating. As soon as precipitation was complete the reaction mixture was heated to a temperature between 50° C. and the boiling point of the mixture. The slurry obtained was stirred for a quarter of an hour, filtered, and washed with 70 liters of ammonia of 0.25% concentration until the washing water after being acidified with HNO₃ produced no further precipitation with AgNO₃.

Further washing was subsequently carried out with 10 liters of distilled water. After having been washed out with distilled water, this gel was dried for 6 hours at 180° C. and subsequently calcined for 2 hours at 500° C. in air. 94 g. of the dry aluminum oxide thus obtained was impregnated with 90 ml. of HF solution, containing 0.47 g. of F. The product thus obtained was then dried for 2 hours at 180° C. and calcined in air for 2 hours at 500° C. It was subsequently impregnated with 12.7 g. of ammonium molybdate (81.4% of MoO₃), dissolved in 90 ml. of H₂O. After drying for 2 hours at 180° C. and calcining in air for 2 hours at 500° C., the catalyst is prepared for use in the process of the invention by passing hydrogen sulfide gas over it for about 4 hours at 500° C.

EXAMPLE VIII

A catalyst suitable for the process of the invention comprises 2% sulfide of tungsten and 2% sulfide of nickel, based on the weight of the final composite catalyst, distended on a silica-zirconia cracking catalyst containing 95 parts silica to 5 parts zirconia, by weight.

We claim as our invention:

1. A process for converting olefins boiling within the gasoline boiling range into paraffins of a more highly branched structure which comprises contacting the olefins in the presence of hydrogen at an elevated temperature and pressure with a catalyst comprising a solid acidic isomerization catalyst on which is deposited a sulfide of a metal selected from the group consisting of the metals in the left-hand column of Group VI of the Periodic Table, the iron group metals of Group VIII of the Periodic Table, and mixtures thereof, and recovering an effluent comprising paraffins having a more highly branched structure than said olefins.

2. A process for converting normal olefins boiling within the gasoline boiling range into paraffins of a more highly branched structure which comprises contacting the olefins in the presence of hydrogen at a temperature of about 100° C. to about 500° C. and a pressure of about 10 atmospheres to about 100 atmospheres, with a solid acidic isomerization catalyst on which is deposited a sulfide of a metal selected from the group consisting of the metals in the left-hand column of Group VI of the Periodic Table, the iron group metals of Group VIII of the Periodic Table, and mixtures thereof, and recovering an effluent comprising paraffins having a more highly branched structure than said olefins.

3. A process for converting olefins boiling within the gasoline boiling range into paraffins of a more highly branched structure which comprises contacting the olefins in the presence of hydrogen at a temperature of about 100° C. to about 500° C., a pressure of about 10 atmospheres to about 100 atmospheres, and a liquid hourly space velocity of from about 0.5 to about 20, with a solid acidic isomerization catalyst on which is deposited a sulfide of a metal selected from the group consisting of the metals in the left-hand column of Group VI of the Periodic Table, the iron group metals of Group VIII of the Periodic Table, and mixtures thereof, and recovering an effluent comprising paraffins having a more highly branched structure than said olefins.

4. A process for converting a normal olefin having from 4 to about 8 carbon atoms per molecule into a paraffin of a more highly branched structure which comprises contacting the olefin in the presence of hydrogen at a temperature of about 100° C. to about 500° C. and a pressure of about 10 atmospheres to about 100 atmospheres, the hydrogen partial pressure being at last 50% of the total pressure, with a catalyst comprising a solid acid isomerization catalyst on which is deposited from about 0.5% to about 15%, based on the weight of the final catalyst, of a sulfide of a metal selected from the group consisting of the metals in the left-hand column of Group VI of the Periodic Table, the iron group metals of Group VIII of the Periodic Table, and mixtures thereof, and recovering an effluent comprising a paraffin having a more highly branched structure than said olefin.

5. A process for converting a normal olefin having from 4 to about 8 carbon atoms per molecule into a paraffin of a more highly branched structure which comprises contacting the olefin in the presence of hydrogen at a temperature of about 100° C. to about 500° C. and a pressure of about 10 atmospheres to about 100 atmospheres, the hydrogen partial pressure being at last 50% of the total pressure, with a catalyst comprising a silica-alumina support having at least 60% by weight silica and on which is deposited from about 0.5% to about 15%, based on the weight of the final catalyst, of a sulfide of a metal selected from the group consisting of the metals in the left-hand column of Group VI of the Periodic Table, the iron group metals of Group VIII of the Periodic Table, and mixtures thereof, and recovering an effluent comprising paraffins having a more highly branched structure than said olefins.

6. A process for converting a normal olefin boiling within the gasoline boiling range into paraffins of a more highly branched structure which comprises contacting the olefin in the presence of hydrogen at a temperature of about 200° C. to about 400° C., a pressure of about 10 to about 100 atmospheres, the hydrogen partial pressure being at least 50% of the total pressure, and a liquid hourly space velocity of from about 0.5 to about 20, with a catalyst comprising from about 0.5 to about 15%, based on the weight of the final catalyst, nickel sulfide supported on silica-alumina having at least 60% by weight silica, and recovering an effluent comprising a paraffin having a more highly branched structure than said olefins.

7. A process according to claim 6 wherein the silica alumina is calcined at an elevated temperature up to about 600° C. prior to the addition of the nickel sulfide.

8. A process for converting a lightly branched olefin boiling in the gasoline boiling range into a highly branched paraffin which comprises contacting said olefin in the presence of hydrogen at a temperature of about 100° C. to about 500° C. and a pressure of about 10 atmospheres to about 100 atmospheres, the hydrogen partial pressure being at least 50% of the total pressure, with a catalyst comprising a solid acid isomerization catalyst on which is deposited a sulfide of a metal selected from the group consisting of the metals in the lefthand column of Group VI of the Periodic Table, the iron group metals of Group VIII of the Periodic Table, and mixtures thereof, and recovering an effluent comprising a paraffin having a more highly branched structure than said olefin.

9. A process according to claim 8 wherein the catalyst comprises nickel sulfide on silica-alumina having at least 60% by weight silica.

10. A process for converting olefins boiling within the gasoline boiling range into paraffins of a more highly branched structure which comprises contacting a cracked gasoline in the presence of hydrogen at an elevated temperature and pressure with a catalyst comprising a solid acidic isomerization catalyst on which is deposited a sulfide of a metal selected from the group consisting of the metals in the left-hand column of Group VI of the Periodic Table, the iron group metals of Group VIII of the Periodic Table, and mixtures thereof, and recovering a substantially saturated gasoline having an increased content of branched paraffins.

11. A process for converting olefins boiling within the gasoline boiling range into paraffins of a more highly branched structure which comprises contacting a cracked gasoline in the presence of hydrogen at a temperature of about 100° C. to about 500° C. and a pressure of about 10 atmospheres to about 100 atmospheres, with a solid acidic isomerization catalyst on which is deposited a sulfide of a metal selected from the group consisting of the metals in the left-hand column of Group VI of the Periodic Table, the iron group metals of Group VIII of the Periodic Table, and mixtures thereof, and recovering a substantially saturated gasoline having an increased content of branched paraffins.

12. A process according to claim 11 wherein the gasoline is a light cracked gasoline fraction boiling below about 100° C.

13. A process according to claim 12 wherein the catalyst is nickel sulfide deposited on silica-alumina having at least 60% by weight silica.

14. A process according to claim 11 wherein the gasoline is a steam cracked gasoline and the catalyst is nickel sulfide deposited on silica-alumina having at least 60% by weight silica.

15. The process according to claim 6 wherein the normal olefin has from 4 to about 8 carbon atoms per molecule.

References Cited in the file of this patent

UNITED STATES PATENTS

| | | |
|---|---|---|
| 2,402,493 | Greensfelder et al. | June 18, 1946 |
| 2,405,440 | Marsh | Aug. 6, 1946 |
| 2,538,248 | Ipatieff et al. | Jan. 16, 1951 |
| 2,674,634 | Greensfelder et al. | Apr. 6, 1954 |
| 2,762,854 | McKinley et al. | Sept. 11, 1956 |
| 2,831,908 | Starnes et al. | Apr. 22, 1958 |
| 2,834,823 | Patton et al. | May 13, 1958 |
| 2,859,170 | Dickens et al. | Nov. 4, 1958 |
| 2,888,501 | Folkins et al. | May 26, 1959 |
| 2,904,500 | Beuther et al. | Sept. 15, 1959 |
| 2,913,393 | Sarno | Nov. 17, 1959 |
| 2,924,629 | Donaldson | Feb. 9, 1960 |